US006997975B2

(12) United States Patent
Stefanoni

(10) Patent No.: US 6,997,975 B2
(45) Date of Patent: Feb. 14, 2006

(54) UNIVERSAL PAN LID ABSORBING AND FILTERING STEAM AND SMELL

(76) Inventor: Roberto Stefanoni, 1, Via Vittorio Veneto, Ello, Lecco, 23848 (IT)

( * ) Notice: Subject to any disclaimer, the term of this patent is extended or adjusted under 35 U.S.C. 154(b) by 161 days.

(21) Appl. No.: 10/644,501

(22) Filed: Aug. 20, 2003

(65) Prior Publication Data

US 2004/0069154 A1 Apr. 15, 2004

(30) Foreign Application Priority Data

Aug. 30, 2002 (IT) .......................... MI20020406 U

(51) Int. Cl.
*B01D 53/04* (2006.01)
*A47J 36/06* (2006.01)

(52) U.S. Cl. .......................... 96/117.5; 96/135; 96/138; 96/148; 96/151; 96/416; 55/385.4; 55/471; 55/519; 220/287; 220/371; 220/377

(58) Field of Classification Search .............. 96/108, 96/117.5, 135, 138, 147, 148, 151, 153, 416; 55/385.1, 518, 519, 385.4, 467, 471; 220/254, 220/287, 300, 302, 367.1, 371, 372, 373, 220/377

See application file for complete search history.

(56) References Cited

U.S. PATENT DOCUMENTS

| 411,185 | A | * | 9/1889 | Crosby et al. ................. 96/148 |
| 1,368,007 | A | * | 2/1921 | Zimmermann et al. .. 126/384.1 |
| 1,794,940 | A | | 3/1931 | Zimmermann |
| 1,942,900 | A | | 1/1934 | Peters |
| 2,210,862 | A | * | 8/1940 | Tronstad ....................... 96/154 |
| 2,524,554 | A | * | 10/1950 | White .......................... 96/148 |
| 2,587,773 | A | * | 3/1952 | Sell et al. ...................... 96/148 |
| 2,664,169 | A | * | 12/1953 | Misener et al. ................ 96/148 |
| 2,676,078 | A | * | 4/1954 | Young .......................... 96/148 |
| 2,687,026 | A | * | 8/1954 | Gleason ....................... 96/108 |
| 2,716,338 | A | * | 8/1955 | Blinn ............................. 73/73 |
| 2,790,436 | A | * | 4/1957 | Pearcy ......................... 96/148 |
| 2,852,326 | A | * | 9/1958 | Westlake, Jr. .............. 312/31.1 |
| 4,043,776 | A | * | 8/1977 | Orel ............................. 96/138 |
| 4,105,420 | A | * | 8/1978 | Moore .......................... 96/416 |
| 4,155,358 | A | * | 5/1979 | McAllister et al. ..... 128/202.22 |
| 4,198,040 | A | * | 4/1980 | Colasent .................. 220/254.4 |
| 4,298,135 | A | * | 11/1981 | Vossen ......................... 96/148 |
| 4,610,705 | A | * | 9/1986 | Sarnosky et al. ............. 96/135 |
| 4,612,026 | A | * | 9/1986 | Pollara et al. ............. 96/117.5 |
| 4,756,726 | A | * | 7/1988 | Peace ........................ 96/117.5 |
| 4,955,995 | A | * | 9/1990 | Pontius ..................... 96/117.5 |
| 5,505,753 | A | * | 4/1996 | Heysek ........................ 96/416 |
| 5,555,994 | A | * | 9/1996 | Chen .......................... 220/287 |
| 5,562,407 | A | * | 10/1996 | Cielo ....................... 415/121.2 |

(Continued)

FOREIGN PATENT DOCUMENTS

EP 0669096 A1 8/1995

(Continued)

Primary Examiner—Robert H. Spitzer
(74) Attorney, Agent, or Firm—Thomas S. Baker, Jr.

(57) ABSTRACT

A universal pan or pot lid is disclosed, absorbing and filtering steam and smell with the optional aid of a sucking fan. This lid preferably of transparent material is provided with a filter changing color when it is saturated and arranged in a burn proof ergonomic knob that can be detached from the lid flat allowing an easy cleaning and washing of all its components.

12 Claims, 7 Drawing Sheets

U.S. PATENT DOCUMENTS

| | | |
|---|---|---|
| 6,105,811 A | 8/2000 | Alfred |
| 6,200,368 B1 * | 3/2001 | Guerin et al. ............ 96/135 |
| 6,328,791 B1 * | 12/2001 | Pillion et al. ............ 96/418 |
| 6,334,888 B1 * | 1/2002 | Collas et al. ............ 96/148 |
| 6,346,143 B1 * | 2/2002 | McGowan ............ 96/117.5 |
| 6,468,332 B2 * | 10/2002 | Goglio et al. ............ 96/134 |

FOREIGN PATENT DOCUMENTS

| | | | |
|---|---|---|---|
| GB | 2028162 A | * | 3/1980 |
| GB | 2124073 A | | 2/1984 |

* cited by examiner

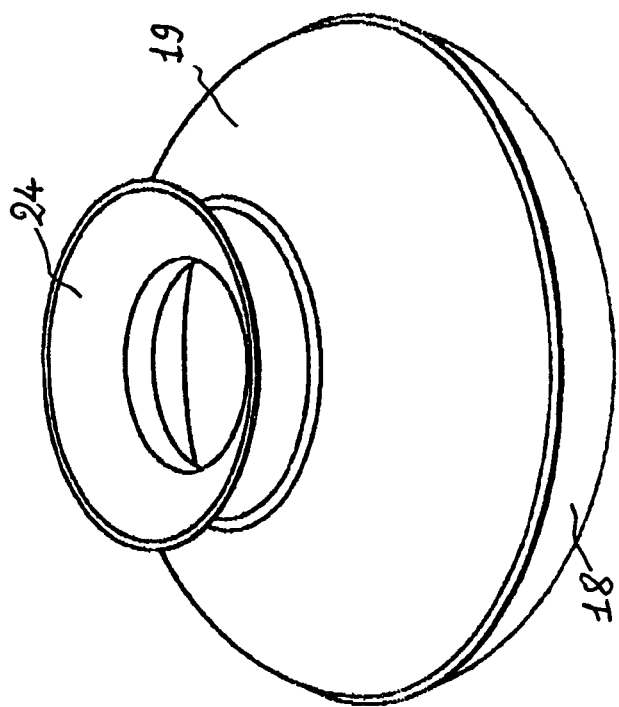
Fig. 4
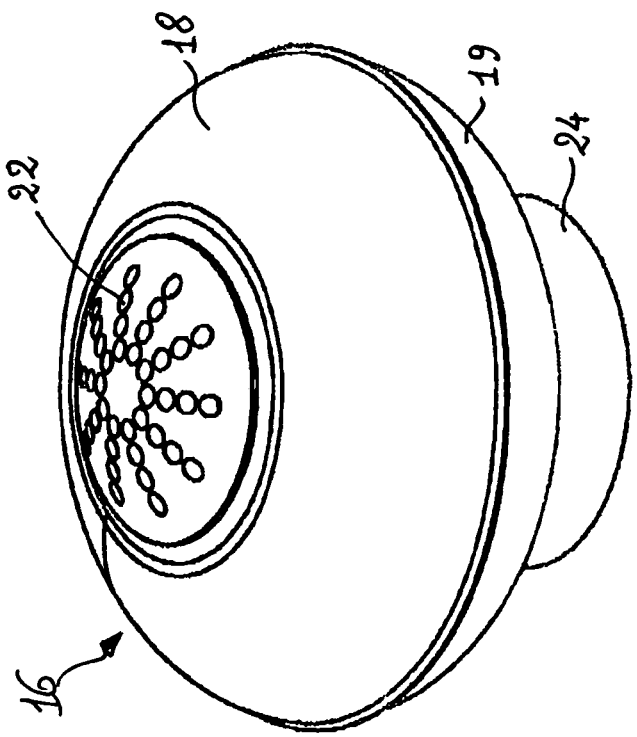

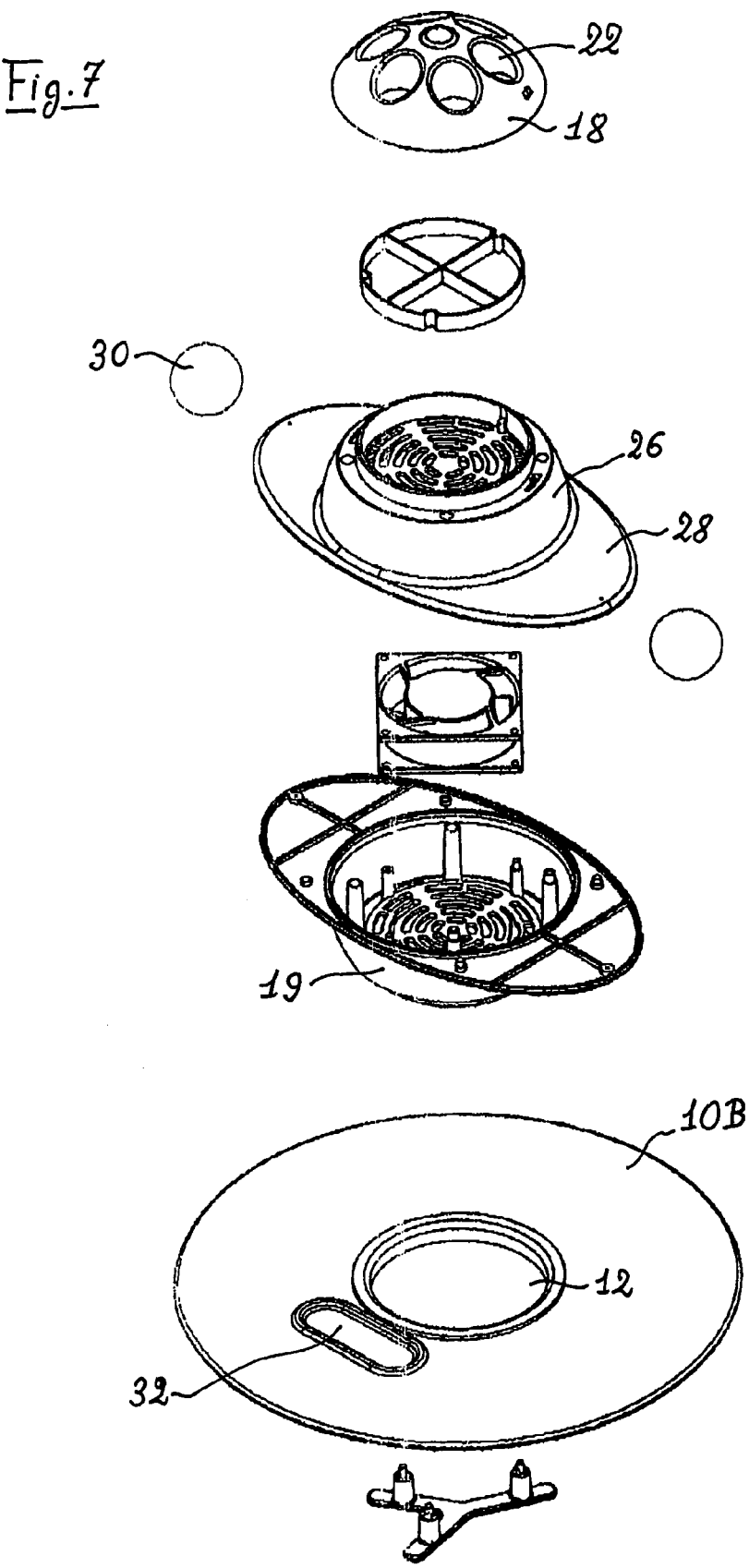

UNIVERSAL PAN LID ABSORBING AND FILTERING STEAM AND SMELL

PRIORITY

This Application claims the priority of Italian Utility Model Application Serial Number MI 2002 U 000406, filed Aug. 30, 2002.

BACKGROUND OF THE INVENTION

The present invention relates to a universal pan lid absorbing and filtering steam and smell, having great utility and easiness of use, solving in an optimal way the hoary and felt problem to avoid kitchen smell spread.

The present inventor already designed a device to be applied on pans and pots to solve this problem, comprising a telescopic cup fitting on pans and pots of any size, but such a device still being perfectly suitable for the intended purpose, comprised a number of components and was relatively expensive and cumbersome.

Reversing the idea the inventor put as a basis of the prior device, the present invention instead of providing a device replacing the traditional lid, modifies said lid transforming it into a true sucking and filtering hood.

In other words, a central body acting as a sucking filter is applied to the lid, said body in its simplest form acts as lid-holding-knob, while the lid flat keeps its plain lid-closing-shape and is possible provided with concentric steps in order to snap fit on the rim of pots and pans of different diameters. In its full version the central body may house a battery operated fan further improving the lid performance.

SUMMARY OF THE INVENTION

The lid flat is made of fire-resistant tempered glass allowing to check every stage of food cooking and moreover allowing introduction of a ladle and addition of ingredients when cooking through a proper opening with a tight gasket comprising a membrane of food grade rubber so that it is not necessary to raise the lid during the cooking operation. However the lid flat could also be made of food grade metals such as aluminum, copper and steel, thus losing only the visibility inside the pan but without departing from the scope of the invention.

The filter made of activated charcoal preferably of coconut, has a high absorbing power removing food smell whatever would be their cooking method, without altering their taste. The filtering cloth has granules of activated charcoal embedded therein and changes color when it is saturated, thus advising the user that replacement is required so as to keep efficient the filtering power. Indeed replacement of the filter is a very simple operation.

In its simplest version, the filter is directly inserted in the gripping-knob that in this case has a burn proof ergonomic shape avoiding contact of the users' hand with the outgoing steam and is made of shock resistant and anti-slip insulating rubber obviously of food grade. The knob may be fixed to the lid flat either in a removable or irremovable way. More particularly to apply the knob to lids prepared by the pan manufacturer, the knob will be provided with an annular ring sucker since its central portion is provided with the steam discharge opening.

Another advantage of the tempered glass flat is to refract downwards the part of steam hitting said flat, so that this hot steam falling back on the cooking food, accelerates the cooking with time and energy saving, while the rest of steam generated in the pan passes immediately through the central filter to be purified.

Not only use of the lid according to the present invention is practical and easy, but also its washing and cleaning in view of the possibility of releasing the glass flat from the body and cleaning it in a dish washing machine as a normal table dish. In its full version, where the central body housing the filter and the fan is of necessity of greater size, it is provided with two lateral wings ending with a handle made of burn proof material such as wood.

These and other objects, features and advantages of the universal lid according the present invention will be apparent and clear from the following detailed description made with reference to the figures of the accompanying sheets of illustrative drawings.

BRIEF DESCRIPTION OF THE DRAWINGS

FIG. 4 is an isometric top and bottom view of the knob with relevant sucker;

FIG. 7 is an isometric exploded view of the lid with the central body provided with filter and powered fan.

DETAILED DESCRIPTION

Figure 1:
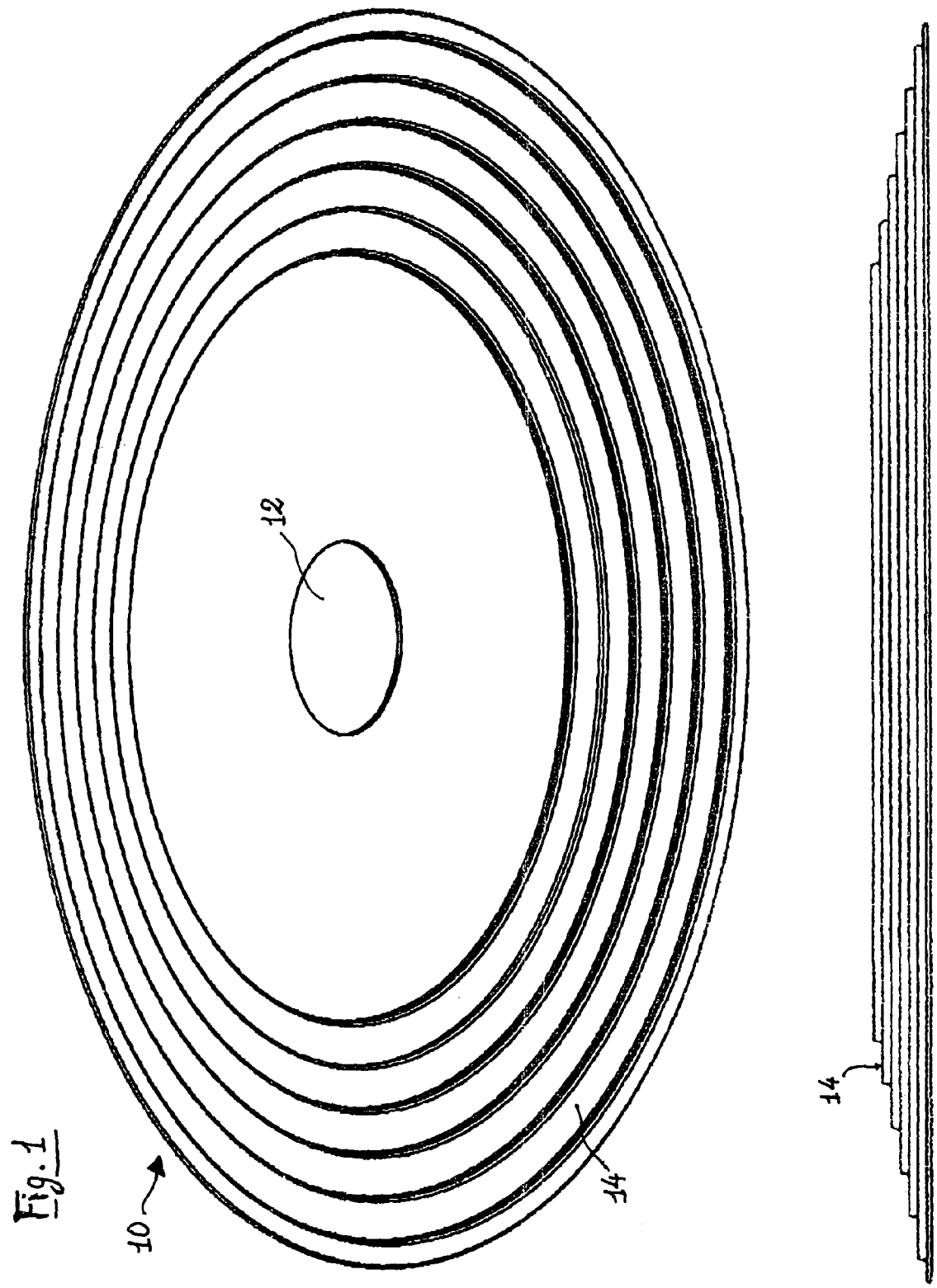
FIG. 1 is a perspective side view of the lid in its universal stepped version.
Figure 2:
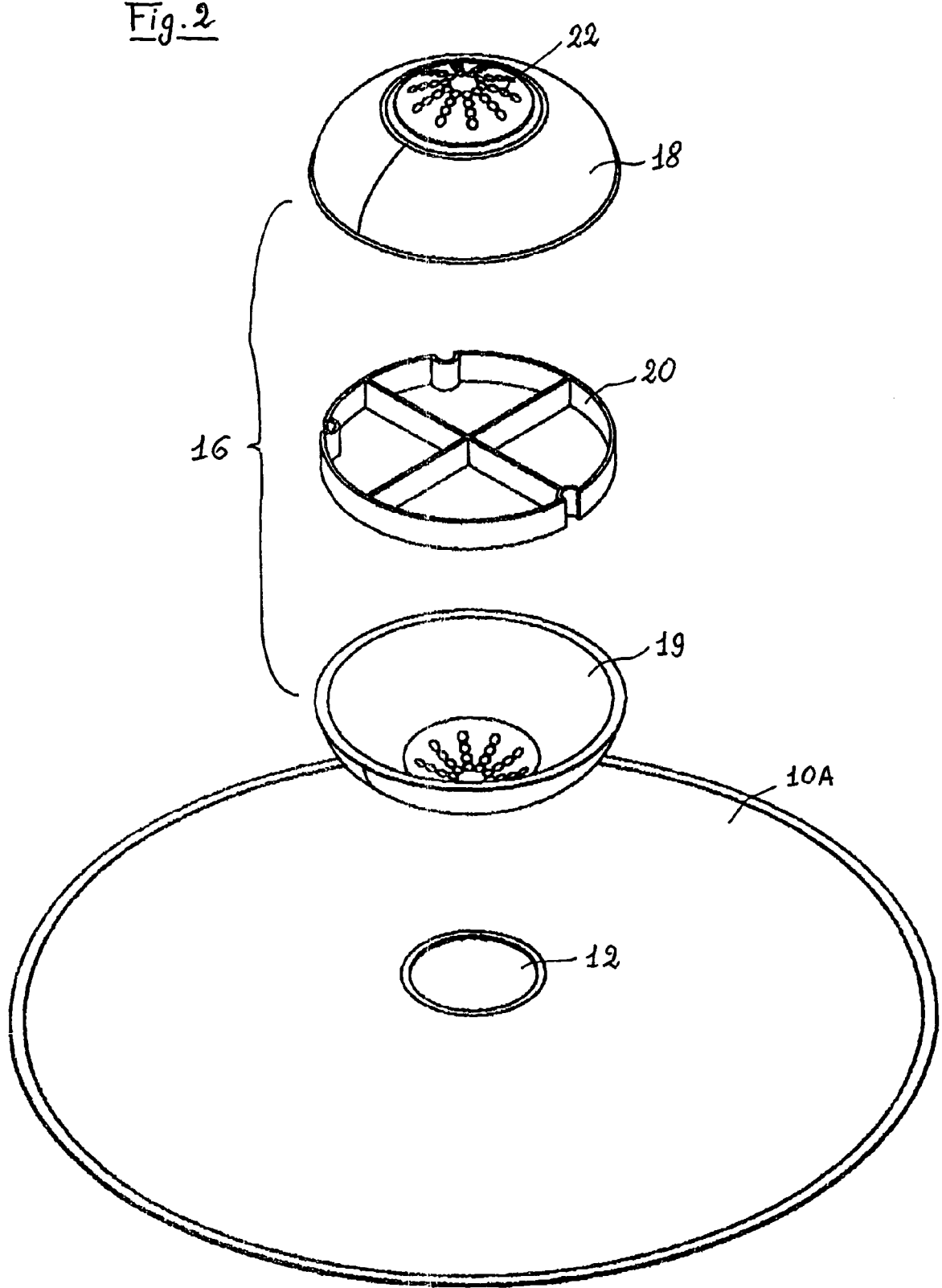
FIG. 2 is an isometric exploded view of the lid with all its components and a flat of non-universal type.
Figure 3:
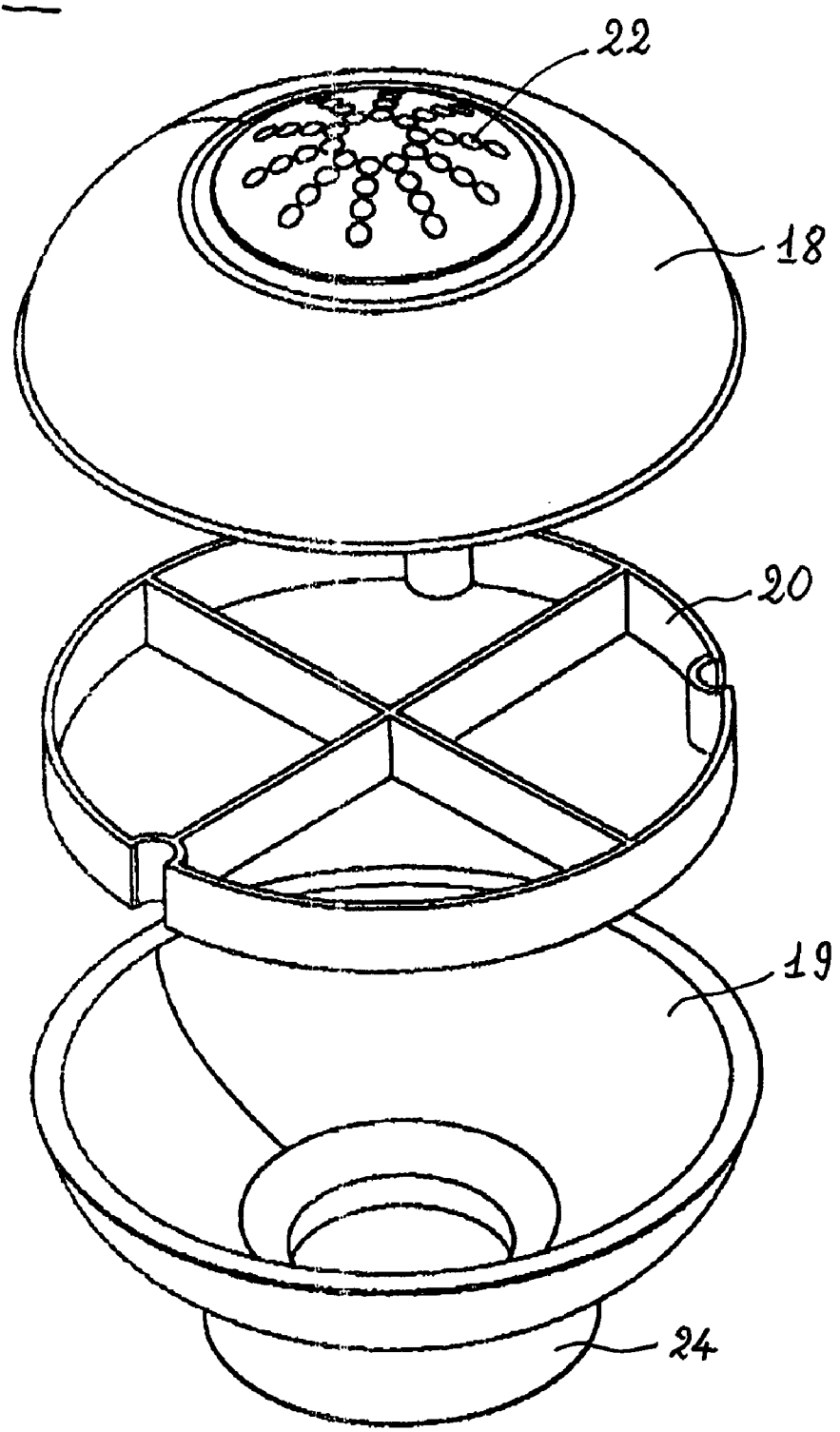
FIG. 3 is an isometric exploded view of the knob with the sucker fitting on any pot and pan of different size.

With reference now to the various figures of the annexed drawings, the lid according to the present invention comprises the flat 10 preferably made of fire-resistant tempered glass and provided with a central opening 12. The flat 10 may be of two kinds and more particularly stepped (FIG. 1) with concentric steps 14 to fit on pots and pans of any size or a plain flat 10A as shown in FIG. 2, of different size according to the diameter of the pot or pan.

The knob 16 comprises two half shells 18 and 19 enclosing the frame 20 housing the filter (not shown). The upper half shell 18 is provided with holes 22 for discharging the filter of the steam, while the lower half shell 19 may be fixed to the opening 12 of the flat 10 or 10A or applied through an annular sucker 24 so that is is possible to detach, clean and/or wash the flat.

Figure 5:
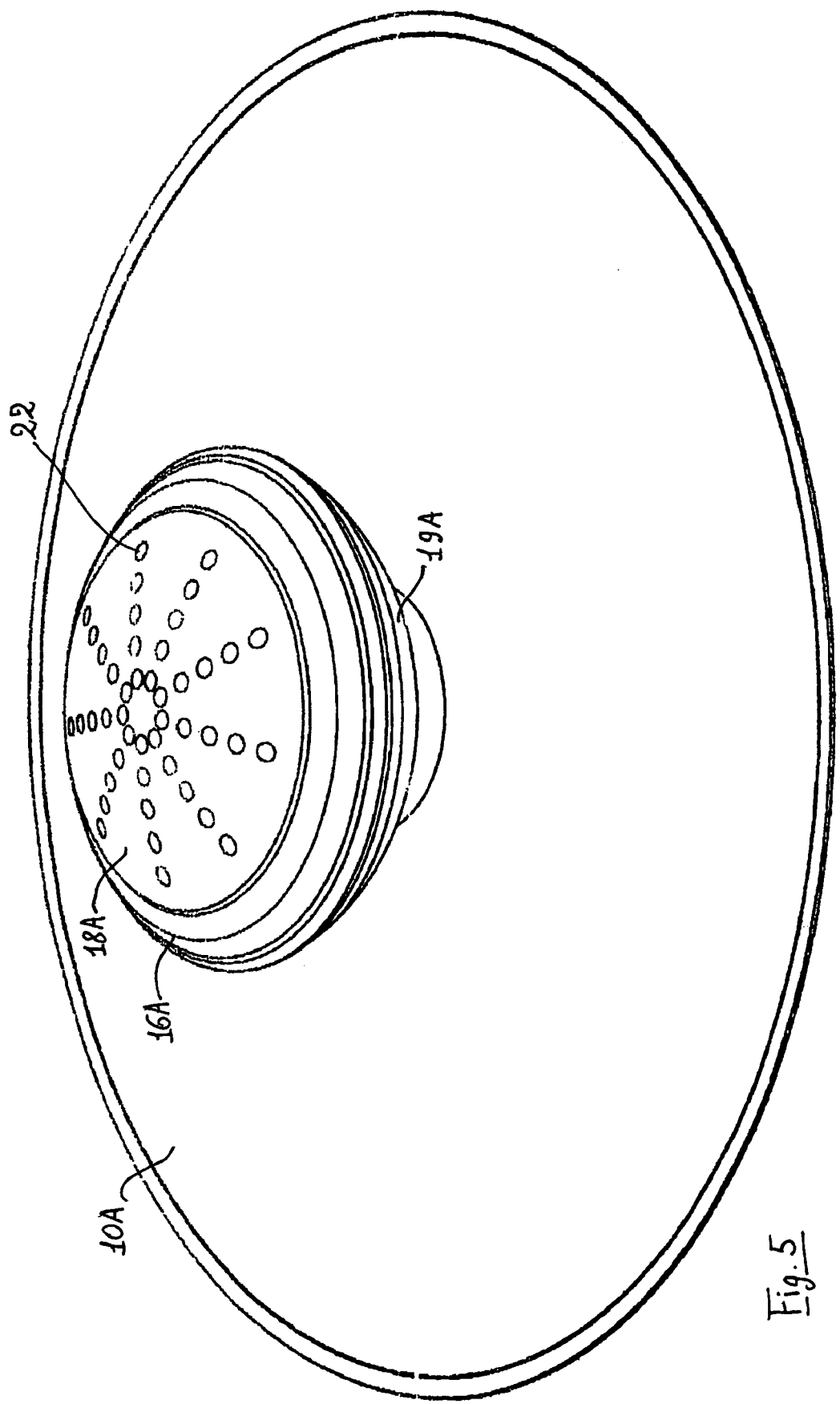
FIG. 5 is a perspective view of the lid with assembled knob.
Figure 6:
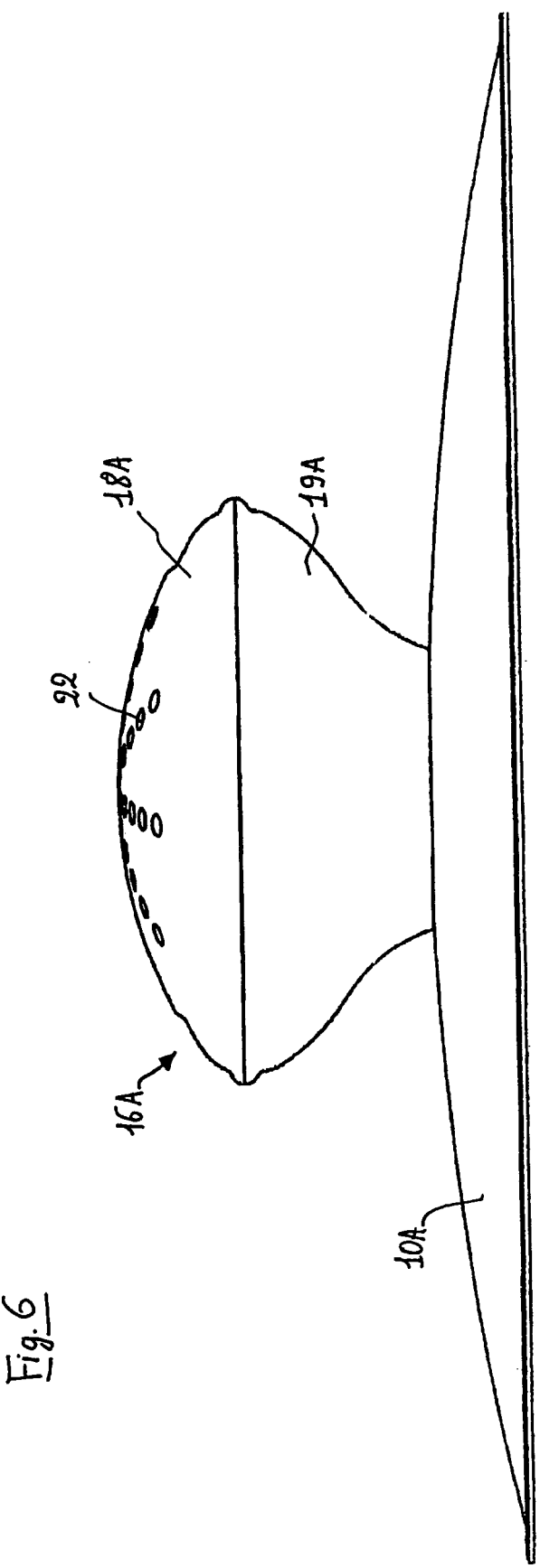
FIG. 6 is a side view of the lid of FIG. 5.

In FIGS. 5 and 6 one can see that the knob 16A may have its upper part 18A of a burn proof ergonomic shape so that the holding portion 19A is not in contact with the steam discharging holes 22. Finally in FIG. 7 one can see that the central body 26 has bigger dimensions in order to accommodate a battery operated fan (not shown). In this case, the central body has two wings 28, each ending with a gripping-handle 30. The lid flat 10B may have an opening 32 for inserting a ladle or adding ingredients to the food in the pan.

From the foregoing description and the figures of the annexed drawings, it is clear that the universal lid according to the present invention fully attains the above mentioned objects, features and advantages, but it is to be noted that modifications, variations and/or additions to its different components, when falling within the innovative conception of the invention, should be considered covered by the characteristics set forth in the appended claims.

What is claimed is:

1. A universal pan lid absorbing and filtering steam and smell, comprising a pan covering flat and a holding-knob; said knob comprising a box-like body defining a filter chamber and consisting of a lower half shell applied to the lid flat and a removable upper half shell to gain access to the filter chamber; said knob further comprising a filtering and purifying filter housed in a chamber made inside the knob, characterized in that a battery operated sucking fan is housed inside the knob, said knob being fixed to the lid flat in a removable way, said lower half shell of said knob being provided with an annular sucker for its application on a central opening made in the pan covering flat in a position corresponding to said knob.

2. The lid according to claim 1, characterized in that the knob upper half shell has an ergonomic shape allowing to grasp the lid without contact with the outgoing hot steam and is made of shock resistant anti-slip material.

3. The lid according to claim 1, characterized in that the filter is provided with activated charcoal with a high absorbing and filtering power.

4. The lid according to claim 3, characterized in that the filter changes color when its saturation is reached allowing its timely replacement.

5. The lid according to claim 3, characterized in that the activated charcoal is made of coconut material.

6. The lid according to claim 1, characterized in that the filter comprises two layers of filtering cloth between which granules of activated charcoal are embedded.

7. The lid according to claim 1, characterized in that the lid flat is made of fire-resistant tempered glass.

8. The lid according to claim 1, characterized in that the lid flat is transparent for a cooking visual control.

9. The lid according to claim 1, characterized in that the flat has an opening with a tight sealing closure, for introduction of tools and addition of ingredients to the food to be cooked.

10. The lid according to claim 1, characterized in that the flat is made of food compatible metal.

11. The lid according to claim 1, characterized in that the flat is plain of a size fitting to a corresponding diameter of pan or pot.

12. The lid according to claim 1, characterized in that the flat is stepped, having a set of concentric steps, each corresponding to a size of pot or pan thus being applicable on pots or pans of any normally used size.

* * * * *